United States Patent [19]

Bechtel

[11] 4,196,524
[45] Apr. 8, 1980

[54] HEAD MOVEMENT INDICATING DEVICE

[76] Inventor: Maynard L. Bechtel, Rte. 2, Box 89J,, King George, Va. 22485

[21] Appl. No.: 906,417

[22] Filed: May 16, 1978

[51] Int. Cl.² .............................................. G01C 9/06
[52] U.S. Cl. ..................................... 33/366; 340/689; 33/371
[58] Field of Search ................................ 33/370–373, 33/366; 340/689

[56] References Cited

U.S. PATENT DOCUMENTS

| | | | |
|---|---|---|---|
| 3,076,186 | 1/1963 | Greene | 340/689 |
| 3,359,550 | 12/1967 | Christensen | 33/366 X |
| 3,362,023 | 1/1968 | McMahon | 340/689 X |
| 3,429,052 | 2/1969 | Hembd et al. | 33/373 X |
| 3,437,339 | 4/1969 | Starch | 33/370 X |

*Primary Examiner*—Charles E. Phillips
*Attorney, Agent, or Firm*—Watson, Cole, Grindle & Watson

[57] ABSTRACT

A device adapted to rest on the top of a person's head for indicating head movement from a predetermined position includes a box-like member supporting an indicator assembly which includes a part spherical support plate nested within a part spherical wall of the member and being capable of multi-directional shifting relative thereto. The assembly further includes an electrically powered alarm element and a pair of electrical contact switch elements which respond to a deviation of the support member from the predetermined position for switching on the alarm. Prior to use, the assembly is capable of assuming a true vertical position within the box-like support and is thereafter fixed in place so that the normally spaced apart contact elements, when in the predetermined position, are brought into contact with one another upon deviation of the support member from such predetermined position. The spacing between the contact elements are adjustable within a predetermined range corresponding to a predetermined range of deviation of the support member.

8 Claims, 6 Drawing Figures

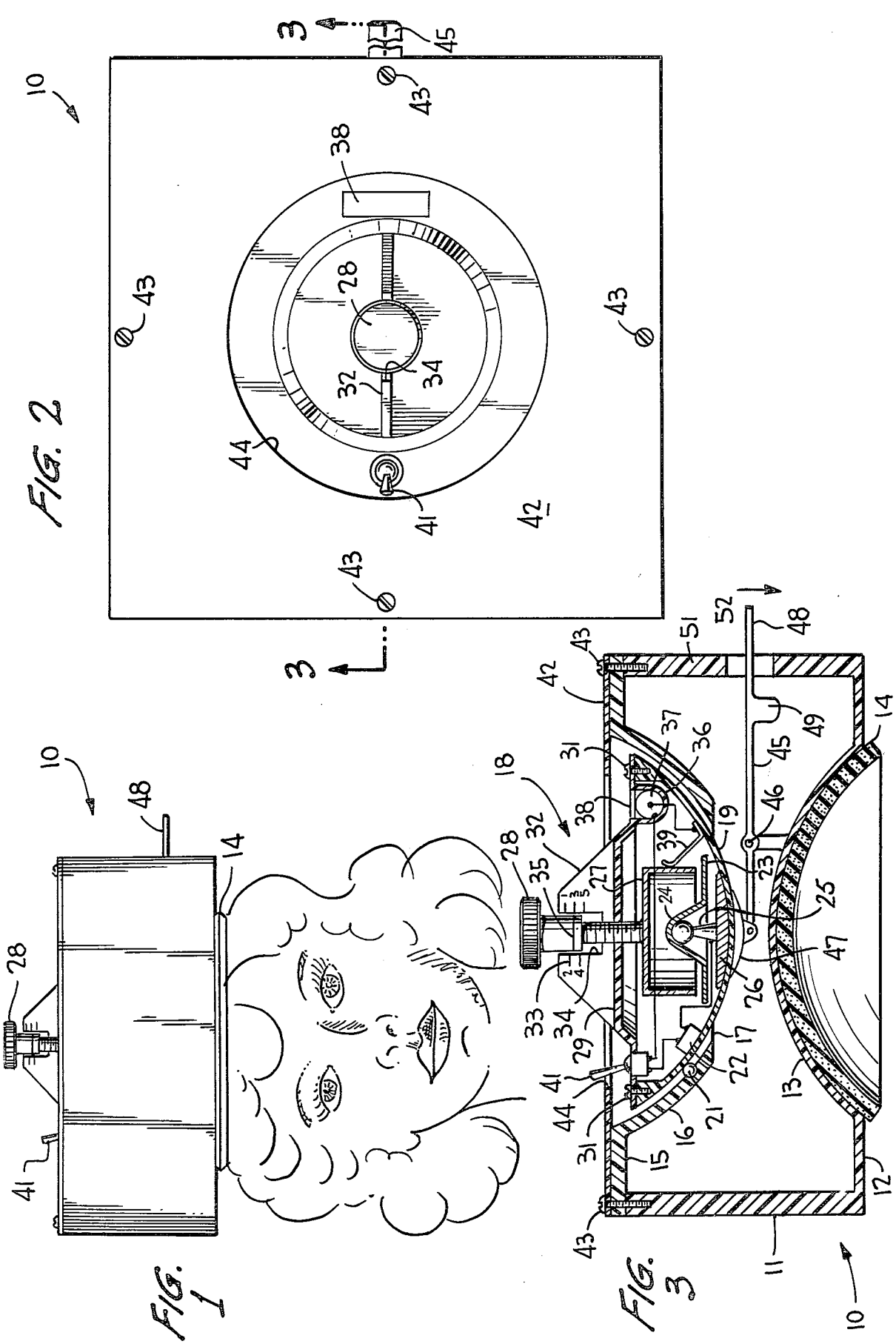

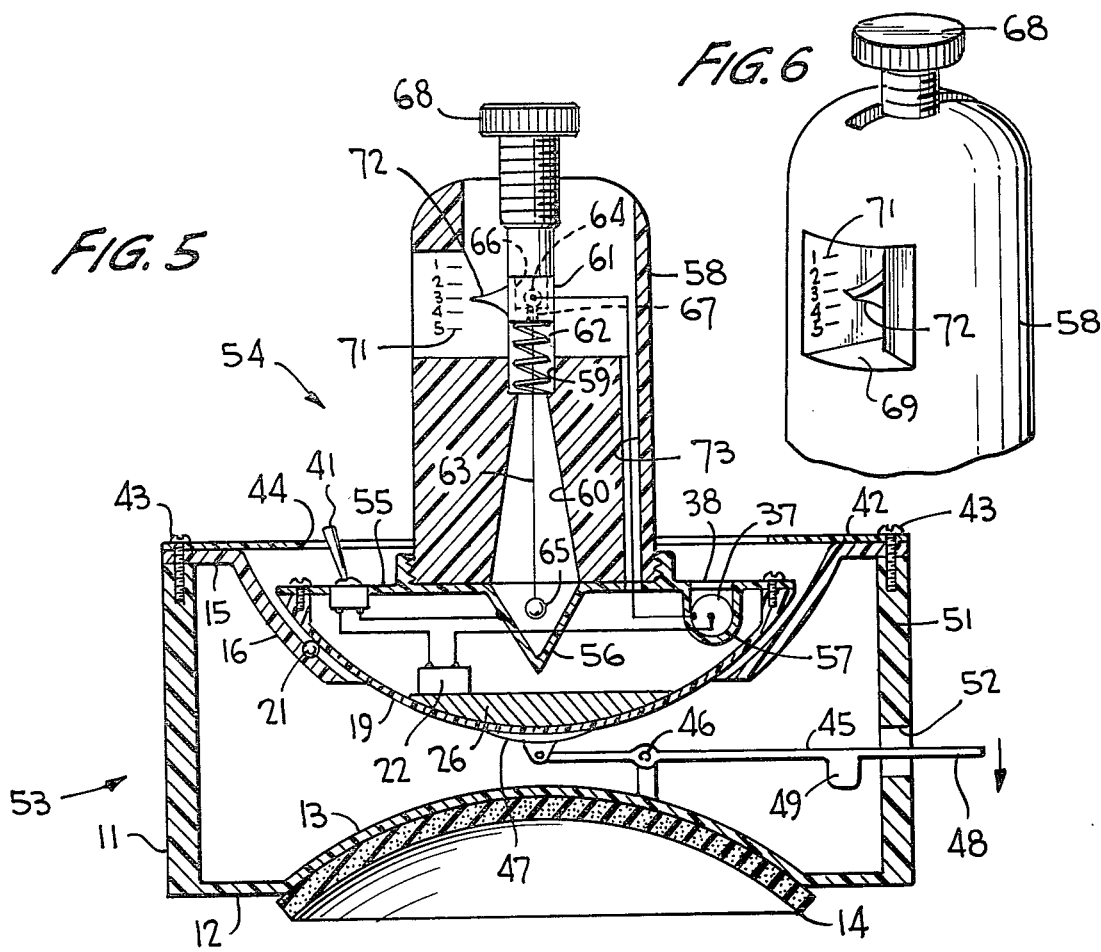
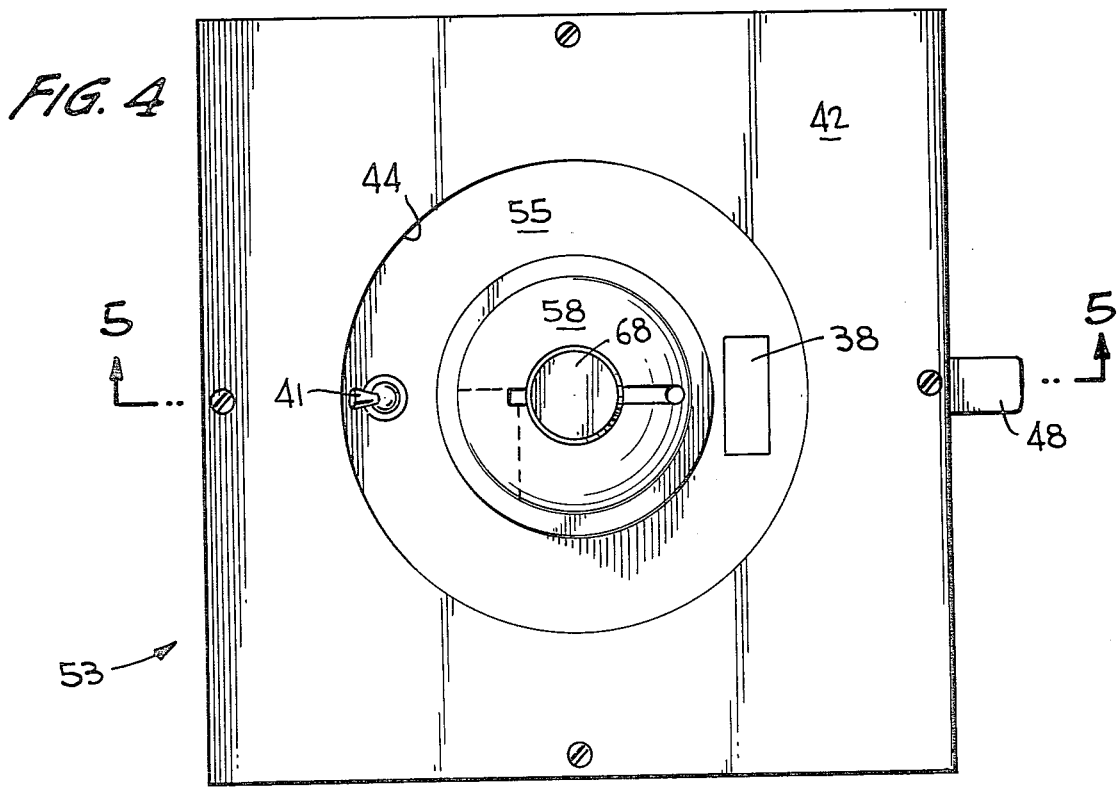

HEAD MOVEMENT INDICATING DEVICE

BACKGROUND OF THE INVENTION

This invention relates generally to a device for use in posture training and the like for indicating head movement from a predetermined position, and more particularly to such a device capable of being adjusted to various settings for indicating various degrees of deviation from a predetermined position.

Presently, the most widespread technique utilized by charm schools and the like for improving posture and graceful bearing is to have the pupil balance a book on his or her head and then walk, dance, pirouette, etc., the object being to carry out these movements without permitting the book to fall. However, many pupils become quickly frustrated when they cannot readily accomplish this feat. Also, when the book falls to the floor time and again the pupil must be constantly bending over to pick it up. Moreover, the book can in no way be adjusted for lesser or greater degrees of posture or bearing.

A posture training device provided in lieu of a book is disclosed in U.S. Pat. No. 2,585,075 in the form of an earring adapted to inform the wearer, at the time a poor posture position is assumed, through the expedient of a plumb bob designed to strike the support strings of any four balls suspended adjacent the body of the earring so as to cause such balls to swing outwardly to contact the body for producing a bell-like warning signal for indicating an improper posture assumed by the wearer. However, such a device is likewise incapable of being adjusted for lesser or greater degrees of posture or bearing.

SUMMARY OF THE INVENTION

It is therefore an object of the present invention to provide an improved posture training device which is not only reliable and efficient in its use but which can be easily and effectively adjusted for improving one's posture to the degree desired, by going from an easy-to-accomplish setting on the device to a more difficult one. This allows for a more natural progression to good posture and graceful bearing.

Another object of the invention is to provide such a device having an alarm which is actuated for indicating deviation of the wearer's head from a predetermined position as a pair of normally spaced electric contact elements are brought into contact with one another, the spacing between such elements being relatively adjustable.

A further object of the present invention is to provide such a device wherein such contact elements are part of an indicator assembly nested within a part spherical wall of a box-like support member of the device, the assembly being capable of assuming a true vertical position prior to use and thereafter being fixed in place.

In carrying out these objectives, the indicator assembly includes a part spherical support plate nested within the part spherical wall of the box-like member with anti-friction bearings therebetween to allow multi-directional relative shifting of the assembly prior to use. A rod having a stabilizer cup is pivoted into engagement with the support plate for thereafter retaining it in an immovable position relative to the box-like support member. In one embodiment, the electrical contact elements include an inverted cup-like member and a floating disc located therebeneath, the disc being centrally supported on a pivot pin mounted on the support plate. The spacing between the contact elements is adjusted by means of a thumbscrew secured to the cup-like element and threadedly engaged with a plate covering the support plate. Markings on the thumbscrew and an adjacent flange on the cover plate, when aligned, indicate the relative spacing between the contact plates.

In another embodiment, a conical depression in the cover plate defines one of the contact elements, and the other contact element is defined by a plumb bob hanging from a plumb line, both of electrically conducting material, and being suspended from a housing mounted on the cover plate. The plumb bob is vertically adjustable by means of a thumbscrew against the force of a coil spring. And, a pointer movable together with the plumb bob relative to markings on the housing indicate the relative spacing between the contact elements.

Other objects, advantages, and novel features of the invention will become more apparent from the following detailed description of the invention when taken in conjunction with the accompanying drawings.

BRIEF DESCRIPTION OF THE DRAWINGS

FIG. 1 is a side elevational view of a head movement indicating device according to one embodiment of the invention shown mounted on the top of the wearer's head;

FIG. 2 is a top plan view of the FIG. 1 device, at a slightly enlarged scale;

FIG. 3 is a sectional view taken substantially along line 3—3 of FIG. 2;

FIG. 4 is a top plan view of a head movement indicating device according to another embodiment of the invention;

FIG. 5 is a sectional view taken substantially along line 5—5 of FIG. 4; and

FIG. 6 is a perspective view of the adjustment and adjustment indicating means of the FIG. 5 indicator assembly.

DETAILED DESCRIPTION OF THE INVENTION

Turning now to the drawings wherein like reference characters refer to like and corresponding parts throughout the several views, the FIG. 1 head movement indicating device 10 is shown mounted on top of the wearer's head during use of the device such as in a posture training exercise. The device includes a box-like support member 11 of electrically insulating material such as plastic, bottom wall 12 of the member being indented as at 13 so as to generally conform to the top of a person's head. A piece of foam rubber 14 or the like is secured to the outer surface of the indentation, or a sandfilled bag (not shown) may be otherwise secured to the indentation, for conforming the device to the top of any size or shaped head, and to further assist in preventing the device from falling off the head.

An upper wall 15 of the support member is in the form of a dish-shaped element having an inward depression 16 of part spherical shape with a central opening 17 being provided in this depression. An indicator assembly generally designated 18 includes a plastic support plate 19 of part spherical shape nested within depression 16, a plurality of anti-friction ball bearings 21 being provided for allowing multi-directional shifting of the support plate relative to depression 16. The assembly further includes an electrically powered buzzer alarm 22 mounted on plate 19, and a pair of spaced electrical contact switch elements for actuating the buzzer when brought into contact with one another. One of such contact elements is in the form of a disc 23 of electrically conducting material and having a central depression 24 for supporting the disc in a free floating manner on a pivot pin 25 mounted on a central weight 26 which is in turn secured to plate 19.

The other contact element is in the form of an inverted cup-shaped element 27 of electrically conducting material disposed directly above disc 23 and having an outer dimension slightly less than the outer dimension of the disc. Element 27 and disc 23 are normally spaced apart a slight distance, and a thumbscrew 28 is provided for vertically adjusting element 27 toward and away from plate 19 and, thus, relative to disc 23. The thumbscrew if fixedly secured at one end to the base of element 27 and is threadedly engaged with a cover plate 29 of electrically insulating material, the cover plate being secured as by screws 31 to the open end of support plate 19. An upstanding flange 32 on cover plate 29 is provided with spaced markings 33 adjacent a central slot 34 thereof, and a marking 35 is provided on the thumbscrew for alignment with one of the five markings 33 upon a turning of the thumbscrew. The spacing between adjacent markings 33 corresponds to an approximately 2° movement of the user's head from the horizontal, when the device is in use. For example, setting 1 allows 10° off the horizontal until the buzzer is actuated, setting 2 allows 8°, setting 3 allows 6°, setting 4 allows 4° and setting 5 allows 2° off the horizontal until the buzzer is actuated.

A recess 36 in the top of cover plate 29 houses a small dry cell battery 37 of any suitable voltage from 1.5 to 9 volts, for example. A plastic cover lid 38 may be snapped in place over the battery. A contact spring 39 of electrically conducting material is mounted on plate 19 and rests with slight pressure against element 27. And, an ON-OFF toggle switch 41 is mounted on cover plate 29 and is wired to the battery as well as to the buzzer, the battery being in turn wired to contact spring 39 and the buzzer being wired to pivot pin 25 for closing the electric circuit through element 27. For maintaining the indicator assembly in place when not in use, a cover plate 42 is secured to support member 11 as by screws 43 which likewise secure upper wall 15 in place. Plate 42 has a central opening 44 through which flange 32 and the thumbscrew extend, opening 44 being sized to permit a portion of plate 42 to overlap with indicator assembly 18, as shown in FIG. 3 of the drawings. Also, means are provided on support member 11 in engagement with plate 19 for fixing it relative to the dish-shaped depression 16. Such means is in the form of an arm 45 pivotally mounted to indentation 13 as at 46 and having a spherically concave, stabilizer cup 47 of rubber or the like mounted at an inner end thereof for engagement with the underside of plate 19 as an opposite end 48 of the rod is moved downwardly in the direction of the arrow of FIG. 3. The rod is weighted as at 49 near end 48 for retaining the rod in the position of FIG. 3 wherein support plate 19 and the remainder of the indicator assembly are fixed relative to depression 16 so as to move together with support member 11 when the head of the wearer deviates from a predetermined position. End 48 extends outwardly of a side wall 51 of the support member through a slot 52. The opposing side edges of rod 45 may be in sliding engagement with the opposing side walls of slot 52 so that frictional engagement therebetween will maintain stop element 47 into and out of engagement with plate 19 upon pivotal movement of the rod.

In operation, device 10 is supported on the top of the wearer's head as shown in FIG. 1 and, before use, end 48 of the rod is moved upwardly for disengagement of cup 47 from support plate 19 so as to permit the indicator assembly to seek a position whereby its central axis extends through the center of gravity. Roller bearings 21 permit the indicator assembly to shift into such a position as aided by weight 26. Thus, the random positioning of the device on the wearer's head will not prematurely cause the switch elements to come into contact with one another since the indicator assembly will first shift into a position whereby its central axis extends through the center of gravity thereof whereby disc 23 and element 27 are substantially horizontal. Thereafter the indicator assembly is effectively clamped into place upon downward movement of rod 45 whereupon contact element 23 will be permitted to move only in response to a deviation of the wearer's head together with the device from the position as predetermined by the horizontal disposition of disc 23. The toggle switch is then moved to an ON position. Thus, depending on the setting of the contact element 27 relative to disc 23, as determined by the aligned markings 33 and 35, the wearer's head and device 10 supported thereon will be permitted to deviate, before sounding the alarm, to that degree as set by the adjustment. For example, if marking 35 is aligned with setting No. 5 of marking 33, the contact elements will be spaced the closest possible distance apart and a deviation of 2° or more off the horizontal will cause the buzzer to sound as an edge of element 27 contacts a portion of disc 23. And, because of the vertical adjustability of element 27, it can deviate from the horizontal by as much as 10° before the buzzer sounds.

In accordance with another embodiment according to the invention, a device generally indicated 53 is shown in FIG. 5 as comprising the same box-like support member 11 as aforedescribed having a rod 45 thereon which functions to stabilize an indicator assembly generally designated 54. This assembly includes support plate 19 except that it is covered by a plate 55 having a central conical depression 56 of electrically conducting material, toggle switch 41 being mounted on this plate and battery 37 being located in a recess 57 provided in the plate. A housing 58, having a central bore 59 therein, is mounted on cover plate 55. The upper portion of bore 59 is cylindrical and its lower portion 60 is conical and opens into depression 56. A cylinder 61 as well as a coil spring 62 supporting the cylinder at its lower end are disposed in the upper portion of the bore. An elongated support in the form of a plumb line 63 of electrically conducting material has spheres 64 and 65, likewise of electrically conducting material, connected at opposite ends thereof, sphere 64 being seated within a recess 66 provided in cylinder 61, and line 63 extending outwardly of the cylinder through a central opening 67. Sphere 65 lies within depression 56 and is spaced from the inner surface thereof a predetermined distance depending on the degree of deviation which is permitted for the device. Sphere 65 is vertically adjustable, so as to alter the spacing between it and depression 56, by means of a thumbscrew 68 bearing against the top of cylinder 61 and threadedly engaging the upper end of bore 59. Vertical adjustment of contact element 65 is therefore made upon the turning of the thumbscrew against the force of spring 62. Housing 58 is provided with a windowopening 69 and has markings 71, for indicating settings 1 to 5, on a side wall of this window opening. A pointer 72 extends outwardly of cylinder 61 toward markings 71 for indicating the setting to which sphere 65 is made. As described with reference to like settings of markings 33 of the FIG. 3 embodiment, movement of the pointer between adjacent settings corresponds to a movement 2° off the horizontal before sphere 65 contacts depression 56. Thus, setting No. 1 allows a 10° deviation before the buzzer sounds, and setting 5 allows a 2° deviation until the buzzer sounds.

Sphere 65 and conical depression 56, which comprise the pair of electric contact switch elements of assembly 54, are similarly wired into an electrical circuit, in any normal manner, as described with reference to assembly 18. Thus, the toggle switch and the battery are each wired to buzzer alarm 22, the toggle switch is further wired to conical depression 56, and the battery is further wired to sphere 64 through a bore 73 provided in housing 58. The operation of device 53 is the same as that described with reference to device 10. For example, cup 47 is disengaged from plate 19 prior to use so as to permit assembly 54 to shift relative to depression 16 until its central axis extends through the center of gravity thereof, as assisted by weight 26. In such position, plumb line 63 is coaxial with such central axis. Thereafter, while the device is on the wearer's head, rod 45 is shifted in the direction of the arrow of FIG. 5 so that cup 47 fixes assembly 54 in place whereafter the assembly will move together with movement of the remainder of the device. Toggle switch 41 is then moved to an ON position. Then, upon deviation of the wearer's head together with device 53 from a plane lying perpendicular to plumb line 63, contacts 65 will touch contact 56 so as to close the electric circuit thereby actuating the buzzer. The degree of deviation premitted is governed by the setting of sphere 65 as in the manner aforedescribed so as to change the spacing between it and conical depression 56 thereby permitting deviation of the device from 2° to 10° off the aforementioned horizontal plane before sounding the buzzer.

From the foregoing it can be seen that a simple and economical yet highly effective device for indicating head movement from a predetermined position, in the course of a posture training exercise, has been devised. The device can be easily and quickly adjusted for lesser or greater degrees of posture or bearing. Of the five settings made possible in accordance with the invention, the first setting is easier to accomplish than balancing a book on the head, and is called, "the average walker." The second setting is equivalent to balancing a book on the head and is called, "the graceful walker." The third setting is slightly harder to accomplish than balancing a book on the head and is called "the very graceful walker." The fourth setting is much harder to accomplish than balancing a book on the head and is called "the walking like a model," and the fifth and final setting is extremely difficult to achieve and is called "walking like an angel." The device according to the invention can therefore be seen as lending itself to a very natural progression to good posture and natural bearing not made possible with prior art devices.

Obviously, many other modifications and variations of the present invention are made possible in the light of the above teachings. For example, the device can also be used as an aid in rehabilitation as well as an aid in gymnastics for keeping the head straight while, for example, performing various routines on a balance beam. It is therefore to be understood that within the scope of the appended claims, the invention may be practiced otherwise than as specifically described.

I claim:

1. A device adapted to rest on the top of a person's head for indicating head movement from a predetermined position, comprising, a support member having an inward depression in a bottom wall thereof for seating said member on the top of the head, an upwardly open dish-shaped element of part spherical shape having a central opening therein and being mounted on said support member, an indicator assembly including a support plate of part spherical shape nested within said element, said assembly further including an electrically powered alarm element and means for electrically switching said alarm element off and on respectively in response to a deviation of said support member from the predetermined position, said switching means including a pair of electrical contact switch elements, one of said contact elements being fixedly mounted on said support plate and the other of said contact elements being spaced from said one contact element in said predetermined position and being contacted by said one contact element upon the deviation of said support member from said predetermined position, means for adjusting the spacing between said contact elements within a predetermined range corresponding to a predetermined range of deviation of said support member from said predetermined position, anti-friction bearings disposed between said dish-shaped element and said support plate for allowing said support plate to shift in nesting relationship to said dish-shaped element so as to thereby permit said indicator assembly to seek a position whereby its central axis extends through the center of gravity, and means on said support member engaging said support plate for fixing said indicator assembly relative to said dish-shaped element into said position whereby its central axis extends through the center of gravity, whereby head movement from said predetermined position correspondingly effects said deviation of said support member and causes said contact elements to come into contact for switching on said alarm element to thereby indicate the head movement.

2. The device according to claim 1, wherein said one contact element comprises a downwardly open cup-shaped element of electrically conducting material, and said other contact element comprises a disc of electrically conducting material disposed below said cup-shaped element, said disc being centrally balanced in a substantially horizontal position on a pivot pin mounted on said support plate, whereby said one contact element moves relative to said other contact element upon said deviation of said support member.

3. The device according to claim 2, wherein said cup-shaped element is mounted for vertical adjustment relative to said support plate.

4. The device according to claim 3, wherein said adjusting means comprises a thumbscrew connected to said cup-shaped element and threadedly engaging a cover plate mounted on said support plate, and cooperative markings on said thumbscrew and said cover plate for determining the relative spacing between said contact plates.

5. The device according to claim 1, wherein said fixing means comprises a rod pivotally mounted between opposite ends on said support member, a stabilizing cup on one end of said rod movable into engagement with said support plate through said central opening upon actuation of said rod.

6. The device according to claim 1, wherein a cover plate is mounted over said support plate, said one contact element comprising a conical depression of electrically conducting material in said cover plate, and said other contact element comprising a plumb line and a plumb bob both of electrically conducting material, said plumb bob extending into said conical depression, whereby said one contact element may be moved into contact with said other contact element upon said deviation of said support member.

7. The device according to claim 6, wherein said plumb line is mounted for vertical adjustment relative to said cover plate.

8. The device according to calim 7, wherein said plumb line is mounted on a housing supported on said cover plate, said adjusting means comprising a thumbscrew in threaded engagement with said housing for vertically adjusting said plumb bob against the force of a spring located in said housing.

* * * * *